United States Patent [19]

Hicks

[11] 4,225,478
[45] Sep. 30, 1980

[54] CATIONIC POLYEPOXIDE RESINOUS COMPOSITION MODIFIED BY A MIXTURE OF AMINES

[75] Inventor: Darrell D. Hicks, Jeffersontown, Ky.

[73] Assignee: Celanese Corporation, New York, N.Y.

[21] Appl. No.: 61,968

[22] Filed: Jul. 30, 1979

Related U.S. Application Data

[60] Division of Ser. No. 947,375, Oct. 2, 1978, which is a continuation-in-part of Ser. No. 858,135, Dec. 7, 1977, abandoned.

[51] Int. Cl.$^2$ ............... C08L 63/00; C08L 63/02; C09D 3/56; C09D 3/58
[52] U.S. Cl. .................. 260/29.2 TN; 260/18 EP; 260/18 TN; 260/19 EP; 260/21; 260/29.2 EP; 260/29.3; 260/29.4 R; 528/103; 528/120
[58] Field of Search ............ 260/29.2 EP, 29.2 TN, 260/29.3, 29.4 R, 18 EP, 18 TN, 19 EP, 21; 528/103, 120

[56] References Cited

U.S. PATENT DOCUMENTS

| | | | |
|---|---|---|---|
| 2,772,248 | 11/1956 | Lieberman et al. | 260/29.2 |
| 3,023,190 | 2/1962 | Damusis | 528/120 |
| 3,278,488 | 10/1966 | Nikles et al. | 528/99 |
| 3,336,253 | 8/1967 | Wong et al. | 260/29.2 |
| 3,367,991 | 2/1968 | Hicks | 525/511 |
| 3,640,926 | 2/1972 | Slater et al. | 260/29.2 X |
| 3,709,847 | 1/1973 | Toepfl et al. | 260/18 |
| 3,719,626 | 3/1973 | May | 260/29.2 |
| 3,728,302 | 4/1973 | Helm | 260/37 |
| 3,801,348 | 4/1974 | Helm | 260/37 X |
| 3,947,338 | 3/1976 | Jerabek et al. | 204/181 |
| 3,954,762 | 5/1976 | Helm | 528/492 X |
| 4,093,594 | 6/1978 | Anderson | 204/181 X |
| 4,116,900 | 9/1978 | Belanger | 528/103 X |
| 4,134,864 | 1/1979 | Belanger | 260/18 |
| 4,137,140 | 1/1979 | Belanger | 204/181 |
| 4,139,510 | 2/1979 | Anderson | 260/29.3 X |

FOREIGN PATENT DOCUMENTS 2426996 12/1974 Fed. Rep. of Germany.

OTHER PUBLICATIONS

Lee, Handbook of Epoxy Resins, 1967, 7-27 to 7-30, 13-7 to 13-16, 15-11 and 24-24 to 24-25.
Epoxy Resins, May et al., 1973, pp. 416-417.

*Primary Examiner*—Howard E. Schain
*Attorney, Agent, or Firm*—Herbert P. Price; K. A. Genoni; T. J. Morgan

[57] ABSTRACT

Polyepoxide resins are reacted with a molar excess of a primary amine to form an amine terminated resin, the amine groups of which are then reacted with a monoepoxide. The primary amine is a mixture of an aliphatic monoamine and an aliphatic diamine which contains one primary amine group and one tertiary amine group. The resinous reaction products can be salted with an acid and can be dissolved or dispersed in water. The aqueous dispersions or solutions can then be formulated into primer coatings for metal objects.

4 Claims, No Drawings

CATIONIC POLYEPOXIDE RESINOUS COMPOSITION MODIFIED BY A MIXTURE OF AMINES

CROSS-REFERENCES TO RELATED APPLICATIONS

This is a division of application, Ser. No. 947,375, filed Oct. 2, 1978, which is a continuation-in-part of application, Ser. No. 858,135, filed Dec. 7, 1977 (now abandoned).

BACKGROUND OF THE INVENTION

The field of art to which this invention pertains is synthetic resins containing a hydrophilic group, said resins being soluble or dispersible in water when salted.

Industrial coating processes utilizing aqueous dispersions or solutions of organic resinous film forming compositions continue to grow in importance. The aqueous coating compositions are used in various applications, such as spray coating, flow coating and electrodeposition coating processes. Particularly useful organic resinous film forming compositions are cationic compositions which, primarily, are used in primer paints for metals. Such cationic compositions which contain amine nitrogen groups have superior corrosion resistance when formulated into primer paints.

The coating of electrically conductive substrates by electrodeposition is an important industrial process. In this process, a conductive article is immersed as one electrode in a coating composition made from an aqueous dispersion of film-forming polymer. An electric current is passed between the article and a counterelectrode in electrical contact with the aqueous dispersion until a desired amount of coating is produced on the article. The article to be coated can be made the anode or the cathode depending upon the ionic nature of the coating system.

There are certain disadvantages in anodic deposition processes. Anodic deposition on ferrous metals tends to discolor the electrodeposited film and phosphate conversion coatings, which are commonly applied to a metal surface before an organic coating composition is deposited thereon, tend to be stripped from the metal under anodic deposition conditions. In addition, it is a peculiarity of anodic electrodeposition coating methods that nascent oxygen is produced at the anode which can react with the resinous coating composition to produce bubbles or voids in the deposited coatings.

The use of cathodic electrodepositable compositions tends to alleviate the discoloration problems and to give improved resistance properties. Although nascent hydrogen develops at the cathode during the electrodeposition process, no metal ions pass into the coating solution or are present in the deposited film. Generally, the amount of nascent hydrogen produced at the cathode does not have the same deleterious effect on the properties of the deposited film as does the nascent oxygen produced during anodic deposition.

Cationic coating compositions generally are derived from resinous compositions containing a basic nitrogen atom which can be salted with an acid and then be dissolved or dispersed in water. Sufficient basic nitrogen atoms should be present so that dispersibility or solubility can be obtained with a minimum amount of acid. If the coating bath is very acidic, considerable corrosion problems with the metal tanks, piping systems and other equipment are encountered.

SUMMARY OF THE INVENTION

This invention pertains to resinous compositions. In particular this invention relates to cationic resinous coating compositions. More particularly, this invention pertains to cationic resinous coating compositions which when salted with an acid are dispersible or soluble in water.

The soluble and fusible resinous composition of this invention is made from a polyepoxide resin, a mixture of primary amines and a monoepoxide. The polyepoxide resin is derived from a diol and an epihalohydrin and has a 1,2-epoxide equivalent weight of about 180 to about 650. One of the primary amines of the mixture is an aliphatic monoamine containing about 8 to about 18 carbon atoms, one primary amine group and no other groups which are reactive with epoxide groups. The other primary amine is an aliphatic diamine which contains one primary amine group and one tertiary amine group and no other groups reactive with epoxide groups. The amines in the mixture are within the mol ratios of about 2:1 aliphatic monoamine:aliphatic diamine to about 1:3 aliphatic monoamine:aliphatic diamine. The monoepoxide contains one 1,2-epoxide group per molecule, no other groups reactive with amine groups and has about 8 to about 24 carbon atoms per molecule. In the composition, the polyepoxide resin, the primary amine mixture and the monoepoxide are reacted in the mol of about 5:6:2 to 2:3:2.

The resinous compositions of this invention contain tertiary amine groups within the polymeric chain as well as pendant tertiary amine groups. The compositions also contain aliphatic hydroxyl groups which are present in the epoxide resin and which are formed when the primary amines react with the epoxide groups. Upon partial salting with an acid, the resins are readily dissolved or dispersed in water. Such aqueous compositions can be formulated into coating compositions which are particularly useful as primers for metals.

DESCRIPTION OF THE INVENTION

The compositions of this invention are the reaction products of polyepoxide resins and mono primary amines further reacted with a monoepoxide. These compositions can be represented by the formula

wherein
 A represents a reacted primary amine,
 E represents a reacted polyepoxide resin,
 M represents a reacted monoepoxide, and
 n represents an integer of 2 to 5.

In the above formula, the AE linkages and the AM linkages which are formed by the reaction of an amine group and an epoxide group, can be represented by the skeletal formula

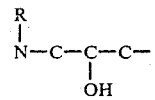

wherein R is a hydrocarbon group. The nitrogen atom is a tertiary amine group and can be salted with an acid. The OH group is available for crosslinking reactions.

The polyepoxide resins useful in this invention are glycidyl polyethers of polyhydric phenols and polyhydric alcohols and contain more than one up to two 1,2-epoxide groups per molecule. Such polyepoxide resins are derived from a dihydric phenol or a dihydric alcohol and an epihalohydrin and have an epoxide equivalent weight of about 180 to about 650. Examples of epihalohydrins are epichlorohydrin, epibromohydrin and epiiodohydrin with epichlorohydrin being preferred. Dihydric phenols and dihydric alcohols are exemplified by resorcinol, hydroquinone, p p-dihydroxydiphenyl propane (or Bisphenol A as it is commonly called), p,p'-dihydroxybenzophenone, p,p'-dihydroxy diphenyl, p,p'-dihydroxydiphenyl ethane, bis(2-hydroxynaphthyl) methane, 1,5-dihydroxynaphthalene, ethylene glycol, propylene glycol, 1,4-butanediol, hydrogenated Bisphenol A, 1,4-cyclohexanediol, 1,3-cyclopentanediol, cyclohexane dimethanol, and the like. These polyepoxide resins are well known in the art and are made in the desired molecular weights by reacting the epihalohydrin and the diol in various ratios, or by reacting a dihydric phenol with a lower molecular weight polyepoxide resin. Preferred polyepoxide resins are the glycidyl polyethers of Bisphenol A having an epoxide equivalent weight of about 350 to about 650 and, most preferred, an epoxide equivalent weight of about 425 to about 550. As used in this invention one mol of the polyepoxide resin is considered to have a molecular weight which is twice the epoxide equivalent weight.

The amines used in this invention are a mixture of aliphatic monoamines which contain one primary amine group per molecule and aliphatic diamines which contain one primary amine group and one tertiary amine group per molecule. The aliphatic monoamines contain about 8 to about 18 carbon atoms, only one amine group, a primary amine group, and no other groups which are reactive with epoxide groups. Examples of such amines are 2-ethylhexylamine, 2,4-diisopropylhexylamine, nonylamine, decylamine, dodecylamine, hexadecylamine, and octadecylamine. Also included are the fatty amines which are named after the fatty acids from which theu are derived, e.g., laurylamine, myristylamine, palmitylamine, stearylamine, oleylamine, linoleylamine and linolenylamine. Fatty amines also include mixture of such amines which are derived from corresponding mixed fatty acids and are named after the naturally occurring oils and waxes from which they are derived, e.g., cocoanut amine, tallow amine, hydrogenated tallow amine and soya amine. The preferred aliphatic monoamines are those amines which contain about 12 to about 16 carbon atoms per molecule.

The aliphatic diamines contain only one primary amine group and only one tertiary amine group and no other groups which are reactive with epoxide groups. These diamines can be represented by the formula

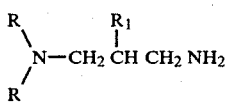

wherein each R is an alkyl group which contains 2 to 6 carbon atoms and $R_1$ is hydrogen or an alkyl group which contains one or 2 carbon atoms. The preferred diamine is 3-diethylaminopropylamine.

The monoamine and the diamine are present in the mixture in the molar ratio of about 2 mols of monoamine to one mol of diamine to about one mol of monoamine to 3 mols of diamine. Preferred ratios are equimolar amounts of the two amines as well as 1 mol of the monoamine and 3 mols of the diamine.

The monoepoxides which are used in this invention to modify the polyepoxide/amine reaction products are those compounds which contain one 1,2-epoxide group per molecule and no other groups which are reactive with amine groups and which contain from about 8 to about 24 carbon atoms per molecule. Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 8 to 24 carbon atoms, e.g., octylene oxide, decylene oxide, dodecylene oxide and nonadecylene oxide; epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is hereby incorporated by reference. Examples of such glycidyl esters are those derived from about 9 to about 19 carbon atoms, particularly Versatic 911 Acid, a product of Shell Oil Company, which acid contains 9 to 11 carbon atoms. The preferred monoepoxides are the monoglycidyl ethers of monohydric alcohols which alcohols contain 8 to 20 carbon atoms.

In preparing the compositions of this invention, the reaction of the primary amine mixture and the polyepoxide resin is conducted with the amines in excess to prevent gelation of the reactants. The molar ratio of polyepoxide resin to primary amines will vary from about 5:6 to about 2:3 and, preferably, about 3:4. As calculated in this invention, this molar ratio is actually the equivalent ratio, i.e., the ratio of 5:6 to 2:3 is based on 1,2-epoxide groups and primary amine hydrogen atoms. After substantially all of the epoxide groups of the polyepoxide resin have reacted, the resulting resinous amine terminated polymer is then reacted with a monoepoxide. The amount of monoepoxide used is one mol of monoepoxide per each amine hydrogen which remains in the polymer, i.e., 2 mols of monoepoxide per mol of primary amine/polyepoxide reaction product. The molar ratio of polyepoxide resin to primary amine to monoepoxide is 5:6:2 to 2:3:2. Alternatively, the polyepoxide resin and the monoepoxide can be added together rather than consecutively to the mixture of amines. The molar ratio of components, however, will be the same as set forth hereinabove. The monoepoxide modified resinous products produce coating compositions which have enhanced flexibility, sufficient softness to make good primers, improved corrosion resistance and good insulating properties when used in electrodeposition processes.

As set forth hereinbefore, the primary amines used in the process of this invention are a mixture of long chain monoprimary amines and diamines which contain one primary amine group and one tertiary amine group. If all monoprimary amine is used, the resulting resinous products require a high equivalence of acid to form salts which can be dispersed in water. The aqueous baths of these salts have low pH's which are undesirable because of corrosion problems. If all diamine is used, the resins can be readily dispersed in water with low equivalent amounts of acid and, therefore, practically neutral baths. However, such products do not have sufficient flexibility, film flow, corrosion resistance, and insulation properties to make good primers. It has been found that a molar mixture of monoamine to diamine of 2:1 to 1:3 gives a good balance of properties.

Normally, the reaction of two difunctional compounds results in a linear polymer, e.g., polyesters formed from ethylene glycol and terephthalic acid. The reaction of a diepoxide and a primary amine, two difunctional compounds, should result in a linear polymer. However, under some conditions, such as when the two compounds are mixed together and heated to a reaction temperature, crosslinking and gel formation can occur. It is postulated that this gel formation results from the reaction of epoxy groups and the hydroxyl groups which are in the epoxy resin or result from the reaction of epoxy groups and amines. The epoxy-hydroxyl reaction is catalyzed by tertiary amine groups which are present in such amines as 3-diethylaminopropylamine or which are formed when a primary amine reacts with 2 epoxy groups. In order to minimize the epoxy-hydroxyl reaction and to prevent gel formation, the compositions of this invention are made by adding the epoxide compounds to the amine mixtures at the reaction temperature of about 50° C. to about 150° C. and, preferably, at about 75° C. to about 100° C. The rate of addition of the epoxide compounds is such that there is substantially no build-up of epoxy groups which will be free to react with hydroxyl groups. This addition is so adjusted that it does not, substantially, exceed the epoxy-amine reaction rate. Ideally, the addition rate is such that the epoxy group will react with a primary or formed secondary amine group as soon as it contacts the amine mixture. The addition time will vary depending upon the reaction temperature, but generally will be from about 30 minutes to about 6 hours.

As stated hereinbefore, the polyepoxide resin and the monoepoxide can be added simultaneously to the primary amine mixture. Preferably, the polyepoxide resin is added to and reacted with the amine mixture followed by addition and reaction of the monoepoxide.

The reaction can be conducted in the absence of solvents. However, in view of the resinous nature of the products, it is preferred to conduct the reaction in an organic solvent. Any organic liquid which is a solvent for the reactants and reaction product and is nonreactive with epoxide groups and amine groups under the reaction conditions can be used. Such solvents include hydrocarbons, ethers, alcohols, polyols, ether alcohols, and the like. Preferred solvents are water soluble solvents, e.g., alkylene glycol mono and diethers. The amount of solvent used can be any amount which is sufficient to render the reactants fluid at the reaction temperature. This amount of solvent will vary from about 0 to about 75 weight percent based on the total weight of the solution, and preferably 20 to 40 weight percent.

As stated hereinbefore, the resinous compositions of this invention are preferably made into aqueous coating compositions. In order to do this, it is necessary to add a neutralizing agent. Neutralization is accomplished by the salting of all or part of the amine groups by a water soluble organic or inorganic acid, e.g., formic acid, acetic acid, phosphoric acid, sulfuric acid, hydrochloric acid, and the like. A preferred acid is formic acid. The extent of neutralization depends upon the particular resin and it is only necessary that sufficient acid be added to solubilize or disperse the resin.

Aqueous coating compositions made from the resinous compositions of this invention can have a pH of about 3 to about 10, but preferably the pH will be about 5.0 to about 7.5 and, most preferably, about 6 to about 7. The amount of acid will vary from about 0.2 to about 1 equivalent for each amine nitrogen equivalent in the resin, but, preferably, about 0.25 to about 0.7 equivalent and, most preferably, about 0.3 to about 0.4 equivalent of formic acid. If the pH is too low, corrosion of equipment is a problem. Electrocoating baths with low pH's have high conductivity which causes the utilization of more current. More gassing occurs at the cathode causing rough coatings. The coatings have lower rupture voltage and the throwing power (the ability to coat protected areas) is decreased. If the pH is high, the resin generally is difficult to dissolve or disperse and the resulting solution or dispersion is unstable. A pH close to neutral is preferred in order to obtain the best balance of coating properties and bath stability.

The resinous composition of this invention, when made into a coating composition will be cured with a crosslinking agent. Such crosslinking agents are aminoplast resins, phenolplast resins and blocked polyisocyanates. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins. Aminoplast resins and their methods of preparation are described in detail in "Encyclopedia of Polymer Science and Technology", Volume 2, pages 1–91, Interscience Publishers (1965), which is hereby incorporated by reference.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenolplast resins are phenol, o, m, or p- cresol, 2,4-xylenol, 3,4-xylenol, 2,5-xylenol, cardanol, p-tert-butylphenol, and the like. Aldehydes useful in this reaction are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1–68. Interscience Publishers (1969), which is hereby incorporated by reference.

The amount of aminoplast or phenolplast resin used with the resinous compositions of this invention is about 8 weight percent to about 30 weight percent of the total vehicle solids weight and, preferably, about 15 to about 20 weight percent.

Useful blocked polyisocyanates are those which are stable in the dispersion systems at ordinary room temperature and which react with the resinous product of this invention at elevated temperatures.

In the preparation of the blocked organic polyisocyanate, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, and 1,4-napthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane-4,4'4''-triisocyanate, 1,3,5-triisocyanate benzene and 2,4,6-triisocyanate toluene; and the tetraisocyanates such as 4,4'-diphenyl-dimethyl methane-2,2',5,5'-tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g. ethylene glycol and propylene glycol, as well as other polyols such as glycerol, trimethylolpropane, hexanetriol, pentaerythritol, and the like, as well as mono-ethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol. Additional blocking agents include tertiary hydroxyl amines, such as diethylethanolamine and oximes, such as methylethyl ketoxime, acetone oxime and cyclohexanone oxime, and caprolactam.

The blocked polyisocyanate is formed by reacting a sufficient quantity of blocking agent with the organic polyisocyanate to insure that no free isocyanate groups are present.

The amount of blocked polyisocyanate used will vary from about 15 weight percent to about 40 weight percent based on the total vehicle solids weight and preferably about 20 weight percent to about 25 weight percent.

The aqueous coating compositions can also contain pigments, coupling solvents, anti-oxidants, surface-active agents and the like. The pigments are of the conventional type and are one or more of such pigments as iron oxides, lead oxides, strontium chromate, carbon black, titanium dioxide, talc, barium sulfate, barium yellow, cadmium red, chromic green, lead silicate and the like. The amount of pigment used will vary from no pigment up to a pigment/binder ratio by weight of 2:1 and preferably a pigment/binder ratio of about 1:1 to 1:4.

Coupling solvents are water soluble or partially water soluble organic solvents for the resinous vehicles used in this invention. Examples of such solvents are ethylene glycol monomethyl ether, ethylene glycol monoethyl ether, ethylene glycol monobutyl ether, diethylene glycol monobutyl ether, ethanol, isopropanol, n-butanol, and the like. These coupling solvents are used in the amounts of 0 up to about 5 weight percent of the total weight of the coating bath. The total bath solids are kept within the range, based on the total bath weight, of about 5 to about 20 weight percent and, preferably, about 12 to about 18 weight percent.

In utilizing the resin of this invention, in electrodeposition processes, the electrocoating bath is prepared in an insulated container with an anode submersed in the bath and the object to be coated as the cathode. A direct electric current is applied using a voltage of 200 to 300 volts for a time sufficient to obtain a coating of about 0.5 to 1 mil, i.e., about 1 to 5 minutes. The coated object is then removed from the bath, rinsed and baked at 150° to 250° C. for 10 to 30 minutes to obtain a cured coating.

When used as dip coating primers, the resinous composition, curing agents, pigments, acid and water are formulated to a solids content of about 25 weight percent to about 35 weight percent in a dip tank. Metal objects are passed through the tank, are allowed to drip to remove excess paint and are baked at about 150° C. for about 10 to about 30 minutes.

The following examples will describe the invention in more detail. Parts and percentages are parts and percentages by weight unless otherwise designated.

EXAMPLE 1

To a suitable reactor were added 50.1 parts of 3-diethylaminopropylamine and 24.3 parts of dodecylamine. A nitrogen gas flush and agitation were begun. Heat was applied raising the temperature to 84° C. A solution of 360.1 parts of a glycidyl polyether of Bisphenol A having an epoxide equivalent weight of 467 in 214.3 parts of propylene glycol methyl ether was then added over a period of 2 hours and 2 minutes while keeping the temperature between 91° C. and 96° C. Heating between 91° C. and 102° C. was continued for one hour and 30 minutes to ensure completeness of the epoxide-amine reaction. At 102° C. the addition of 65.5 parts of a glycidyl ether of mixed fatty alcohols containing predominantly n-octyl and n-decyl groups, said glycidyl ether having an epoxide equivalent weight of 230, was begun and continued over 31 minutes with the temperature rising to 106° C. Heating between 106° C. and 110° C. was continued for 2 hours and 52 minutes to ensure completeness of the reaction.

The epoxy-amine adduct solution (48.6 parts) was blended with a butylated melamine formaldehyde resin solution at 66.7 percent in a mixture of 87.3 percent ethylene glycol methyl ether and 12.7 percent butanol (9.0 parts). The blend was slowly added with stirring to a solution of 1.27 parts of formic acid (89 percent in water) and 102 parts of water to form an almost clear solution. The solution was cooled to room temperature and was diluted with an additional 240 parts of water. This solution, having a pH of 5.9, was then placed in an electrocoating tank. Steel panels were made the cathode in a direct electric circuit and were immersed in the solution. The panels were coated 1 minute at 200 volts, at an initial current of 1 ampere which quickly fell to about 0.1 ampere. The coated panels were removed from the bath, were rinsed with water and were baked at 190° C. for 20 minutes. The coatings had a film thickness of 0.3 to 0.35 mil and were fairly smooth and glossy. The coatings were somewhat softened after 100 double rubs with methylethyl ketone.

The epoxy-amine adduct solution (42.9 parts) was blended with 12.5 parts of an 80 percent solution in ethylene glycol monoethyl ether acetate of a blocked polyisocyanate made from a polymethylene polyphenylisocyanate having an average functionality of 2.7 block with caprolactam on the basis of one mol of caprolactam per NCO equivalent of the polyisocynate. This blend was slowly added with stirring to a solution of 1.12 parts of formic acid (89 percent in water) and 104 parts of water. The solution was then further diluted with 240 parts of water. This solution, which had a pH of 6.2 was placed in an electrocoating bath and steel panels were coated at the cathode of a direct electric circuit at 200 volts for 1 minute. The initial current was 1.6 amperes with a quick drop to 0.1 ampere. The coated panels were removed from the bath, rinsed with water and baked at 163° C. for 20 minutes. The coatings were somewhat rough and textured but had fair to good gloss and were well cured. After 100 methylethyl ketone double rubs, the coatings exhibited slight softening with quick recovery.

The epoxy-amine adduct solution (45.7 parts) was blended with a 10.6 parts of a 75.7% solution in methylisobutyl ketone/ethylene glycol monomethyl ether (53/47) of a blocked polyisocyanate made from a polymethylene polyphenyl polyisocyanate having an average functionality of 2.4 blocked with 0.8 equivalents of caprolactam and 0.3 equivalents of 2,2,4,-trimethyl-1,3-pentanediol per NCO eqiuvalent. This blend was dissolved in a solution of 0.94 part of formic acid (89% in water) and 343 parts of water. The resulting solution, pH-6.4, was made into an electrocoating bath and steel panels were coated using 200 volts, 250 volts and 300 volts for 2 minutes. Coating having dry film thicknesses of 0.9–1.1 mols were obtained from the runs at 200 and 250 volts.

Plating at 300 volts causes rupture of the coatings. The coated panels from the 200 and 250 volt runs were removed from the bath, rinsed and baked for 20 minutes at 163° C. The coatings had uniform moderate pinholing and a pencil hardness of H-2H. Methylethyl ketone, 100 double rubs, definitely softened the coatings.

EXAMPLE 2

To a suitable reactor were added 135.2 parts of dodecylamine and 279.4 parts of 3-diethylaminopropylamine. Agitation, a nitrogen flush and heat was applied, raising the temperature to 112° C. A solution of 2020 parts of the glycidyl polyether of Bisphenol A, having an epoxide equivalent weight of 470, in 1200 parts of propylene glycol methyl ether was added over a period of 1 hour and 58 minutes with the temperature being held between 98° C. and 114° C. After additional heating at 99° C. for 1 hour and 5 minutes the addition of 365.4 parts of the glycidyl ether of mixed fatty alcohols described in Example 1 was begun and completed over a 28 minute period with the temperature rising to 102° C. Additional heating to 107° C. over 2 hours and 16 minutes was continued to ensure completeness of the reaction.

After cooling to room temperature, 48.6 parts of the resinous product were blended with 9 parts of the butylated melamine-formaldehyde resin described in Example 1 and were added to s solution of 1.27 parts of formic acid (89% in water) in 102 parts of water heated to 70° C. The solution was cooled to room temperature and was further diluted with 240 parts of water. This solution, pH 5.8, was placed in an electrocoating bath and was used to coat steel panels using 200 volts for 1 minute. The initial current was 1 ampere which quickly dropped to 0.1 ampere. The coated panels were removed from the bath, rinsed with water and baked at 190° C. for 20 minutes. The resulting coatings had an average thickness of 0.3 mil and a pencil hardness of 3H-4H. The coatings were fairly smooth, glossy and well cured exhibiting only a slight effect after 100 double rubs with methylethyl ketone.

EXAMPLE 3

Using the same procedure described in Example 1, 269.9 parts of n-dodecylamine and 185.6 parts of 3-diethylaminopropylamine were reacted with 2014.4 parts of a glycidyl polyether of Bisphenol A having an epoxide equivalent weight of 470 followed by reaction with 330.1 parts of the glycidyl ether of mixed fatty alcohols containing, predominantly, n-octyl and n-decyl groups, said glycidyl ether having an epoxide equivalent weight of 231. The reactions were carried out in 1200 parts of propylene glycol methyl ether.

Part of the above solution, 46.2 parts, was blended with 10.6 parts of a 75.7% solution in methylisobutyl ketone/ethylene glycol monomethyl ether (53/47) of a blocked polyisocyanate made from a polyphenyl isocyanate having an average functionality of 2.4 blocked with 0.8 equivalents of caprolactam and 0.3 equivalents of 2,2,4-trimethyl 1-3-pentanediol per NCO equivalent. This blend was dissolved in a solution of 0.94 parts of formic acid (89% in water) and 343 parts of water. The resulting blend, pH=5.0, was placed in an electrocoating apparatus and steel panels were coated at the cathode of a direct electric circuit. Panels were coated at several voltages, 200 volts 250 volts and 300 volts, for 2 minutes. All depositions drew a current of 1 ampere initially which quickly dropped off to 0.1 ampere. The panels were removed from the bath, rinsed with water and baked at 163° C. for 20 minutes. The coatings on the panels deposited at 200 volts had a dry film thickness of 0.4–0.5 mil, at 250 volts - 0.5–0.6 mil and at 300 volts 0.7–0.9 mil. The pencil hardness of all the films was H–2H. The film appearance of the coatings deposited at 200 volts and 250 volts was smooth and glossy with moderate pinholing. The coatings deposited at 300 volts were very rough.

A repeat of the depositions using 0.84 part of formic acid in place of the 0.94 part, the bath pH being 5.3, gave comparable results.

EXAMPLE 4

Using the same procedure described in Example 1, 170.8 parts of n-hexadecylamine and 268.8 parts of diethylaminopropyl amine were reacted with 1951.6 parts of the glycidyl polyether of Bisphenol A having an epoxide equivalent weight of 470 in 1200 parts of propylene glycol methyl ether followed by reaction with 408.8 parts of a glycidyl ether of mixed fatty alcohols containing predominantly n-dodecyl and n-tetradecyl groups, said glycidyl ether having an epoxide equivalent weight of 295.

An electrocoating bath was prepared from 91.4 parts of the resin solution blended with 21.1 parts of the blocked polyisocyanate solution described in Example 1 (the polymethyl polyphenyl polyisocyanate blocked with caprolactam and 2,2,4-trimethyl-1,3-pentanediol), 1.73 parts of formic acid (90% in water) and 687 parts of water. Steel panels were coated using 250 volts for 30 seconds, 45 seconds, 60 seconds, 90 seconds and 120 seconds. The coated panels were removed from the bath, rinsed with water and baked for 20 minutes at 165° C. The films were well cured with a pencil hardness of 2H–3H. They softened slightly after 100 double rubs with methylethyl ketone.

EXAMPLE 5

Using the same procedure described in Example 1, 225 parts of n-dodecylamine and 155 parts of 3diethylaminopropylamine were reacted with a glycidyl polyether of Bisphenol A having an epoxide equivalent weight of 470 (2146 parts of a solution of the glycidyl polyether at 73.8% solids in propylene glycol methyl ether), followed by reaction with 274 parts of a glycidyl ether of mixed fatty alcohols containing predominantly n-octyl and n-decyl groups, said glycidyl ether having an epoxide equivalent weight of 230.

To a suitable mixing tank were added 8.12 parts of the resin solution described above, 1.66 parts of ethylene glycol butyl ether, 0.2 part of formic acid (90% in water) 15.01 parts of water, 6.0 parts of a silicone based defoamer, 3.31 parts of carbon black, 5.52 parts of basic white lead silicate and 2.21 parts of magnesium silicate. When thoroughly mixed, the mixture was ground by passing through a sand grinder.

The pigment paste was then blended with a solution of 15.93 parts of the resin solution described in the first paragraph of this example, 3.24 parts of ethylene glycol butyl ether, 9.78 parts of a blocked polyisocyanate solution at 74.06% solids in a mixture of 52.9% ethylene glycol methyl ether and 47.1% methylisobutyl ketone, the blocked polyisocyanate being made from 55.94 parts of a polymethylene polyphenylisocyanate having an average NCO functionality of 2.4, 9.58 parts of methylethyl ketoxime, 6.73 parts of 2,2,4-trimethyl-1,3-pentaediol and 27.75 parts of caprolactam, 0.39 part of formic acid (90% in water) and 28.63 parts water.

A dip tank was filled with the aqueous paint reduced to application solids of 30%. Metal objects were totally immersed in the paint, and, after removal were allowed to drip for ten minutes to allow run-off of excess paint. The coated objects were then baked for 25 minutes at 193° C. The resulting coatings were well cured and exhibited excellent corrosion resistance.

It is to be understood that the foregoing detailed description is given merely by way of illustration and that many variations may be made therein without departing from the spirit of the invention.

What is claimed:

1. An aqueous composition comprising a resinous composition salted with an acid and dissolved or dispersed in water wherein the resinous composition is the reaction product of
   (A) a polyepoxide resin derived from a dihydric phenol or a dihydric alcohol and an epihalohydrin, said polyepoxide resin having a 1,2-epoxide equivalent weight of about 180 to about 650;
   (B) an amine mixture of
      (1) an aliphatic monoamine containing about 8 to about 18 carbon atoms, one primary amine group and no other groups reactive with epoxy groups, and
      (2) an aliphatic diamine containing one primary amine group and one tertiary amine group and no other groups reactive with epoxide groups wherein the molar ratio of (1) and (2) in the mixture varies from about 2:1 to about 1:3, and
   (C) a monoepoxide which contains one 1,2-epoxide group and no other groups reactive with amine groups, said monoepoxide having about 8 to 24 carbon atoms wherein A, B and C are reacted in the mol ratio of 5:6:2 to 2:3:2, and wherein A and C are added to B at a reaction temperature of about 50° C. to about 150° C. at an addition rate which does not substantially exceed the epoxy-amine reaction rate.

2. The aqueous composition of claim 1 plus a crosslinking agent.

3. The aqueous composition of claim 2 wherein the crosslinking agent is an aminoplast resin, a phenoplast resin, or a blocked polyisocyanate.

4. A primer paint composition comprising the composition of claim 2 plus pigments.

\* \* \* \* \*